April 20, 1937.  J. W. LOGAN, JR  2,077,945
MAGNETIC BRAKE CONTROL
Filed March 14, 1934      3 Sheets-Sheet 2
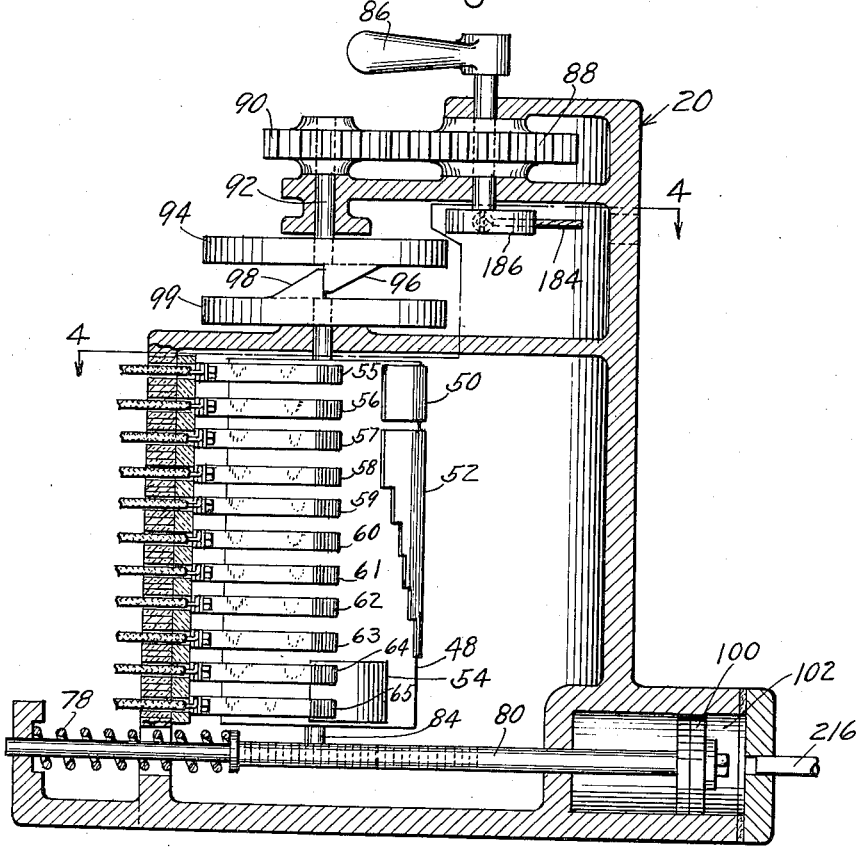
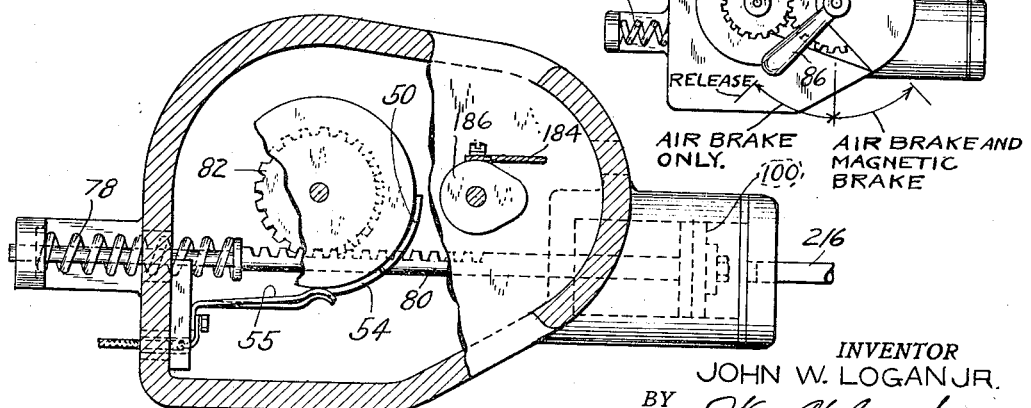
INVENTOR
JOHN W. LOGAN JR.
BY
ATTORNEY April 20, 1937.  J. W. LOGAN, JR  2,077,945
MAGNETIC BRAKE CONTROL
Filed March 14, 1934  3 Sheets-Sheet 3

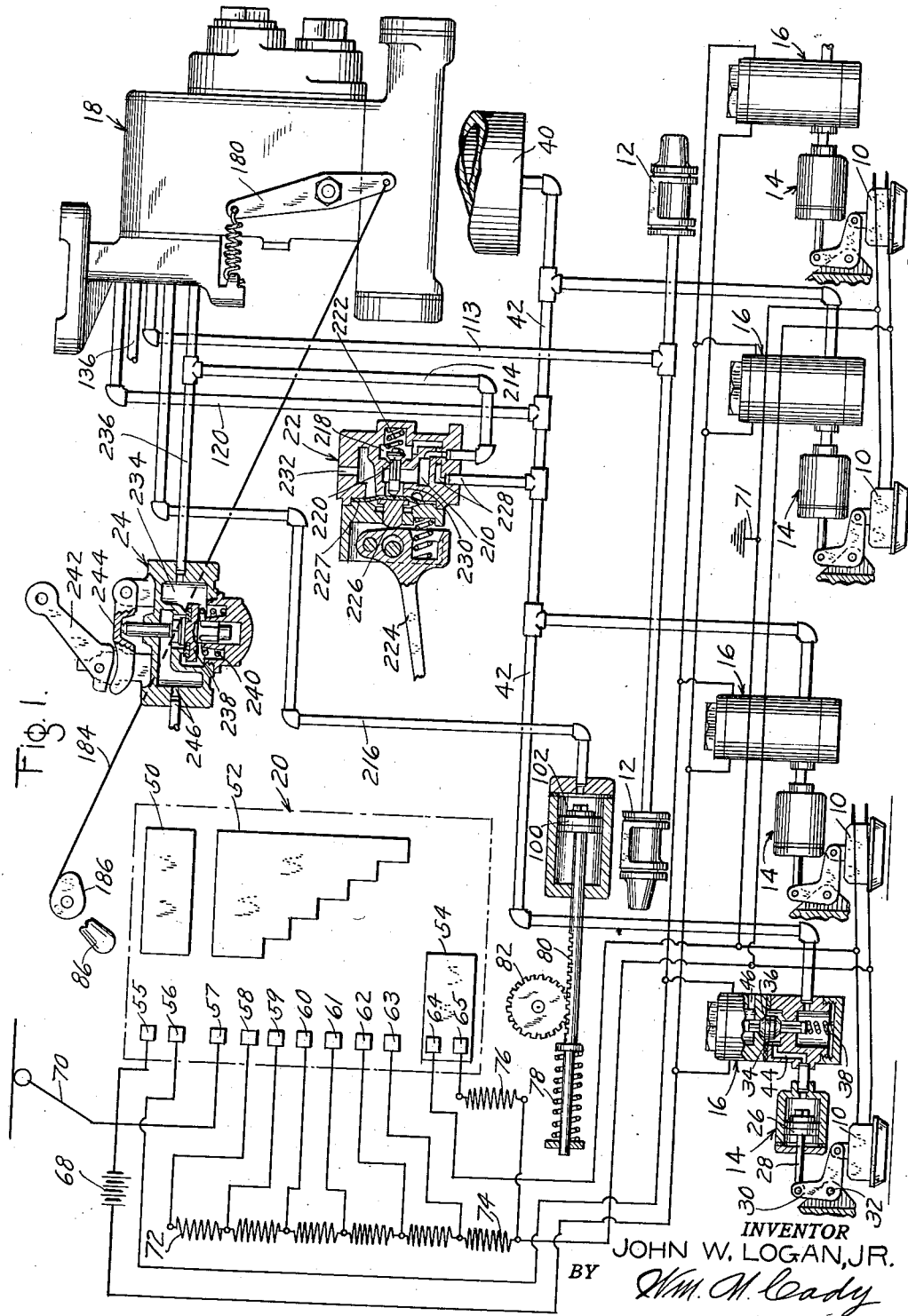

INVENTOR
JOHN W. LOGAN, JR.
BY Wm. M. Cady
ATTORNEY

Patented Apr. 20, 1937

2,077,945

UNITED STATES PATENT OFFICE 2,077,945

MAGNETIC BRAKE CONTROL

John W. Logan, Jr., Wilkinsburg, Pa., assignor to The Westinghouse Air Brake Company, Wilmerding, Pa., a corporation of Pennsylvania Application March 14, 1934, Serial No. 715,512

21 Claims. (Cl. 303—3)

This invention relates to a magnetic brake control, and more particularly to a brake equipment for traction vehicles and railway trains employing both magnetic brakes and fluid pressure brakes.

A desirable type of brake equipment to use for high speed traction vehicles and railway trains is one employing both friction brakes and magnetic brakes. The friction brakes are preferably operated by fluid pressure means and adapted to produce a braking effect on the wheels of the vehicle or train, while the magnetic brakes are adapted to produce a braking effect on the track, and may be controlled either by fluid pressure means, electrical means, or a combination of the two. In such an equipment a greater braking effect can be produced by operation of both the friction and magnetic brakes, than can be obtained by operation of the friction brakes alone.

It is a principal object of this invention to provide an improved brake equipment employing both friction and magnetic brakes.

A more specific object of the invention is to provide an equipment employing both magnetic and friction brakes, in which novel means are provided for controlling the degree of the braking effect produced by the brakes.

Another object of the invention is to provide a braking equipment of this character in which both fast application and fast release of the magnetic brakes may be effected without damage to the magnetic brake windings due to high inductive voltages.

A further object of the invention is to provide an equipment in which both service and emergency applications of both the friction and magnetic brakes are controlled by manually operated means, but which provides for effecting an emergency application of both the friction and magnetic brakes from other points in the vehicle or train.

Further objects will be apparent from the following description, which is taken in connection with an embodiment of the invention illustrated in the attached drawings, in which, Fig. 1 is a diagrammatic view of apparatus comprising this embodiment, arranged for adaptation to a single vehicle.

Fig. 2 is a vertical sectional view of a controller device which may comprise a part of the embodiment shown in Fig. 1.

Fig. 3 is a top plan view of the controller device shown in Fig. 2.

Fig. 4 is a view along the line 4—4 of Fig. 2.

Figure 5:
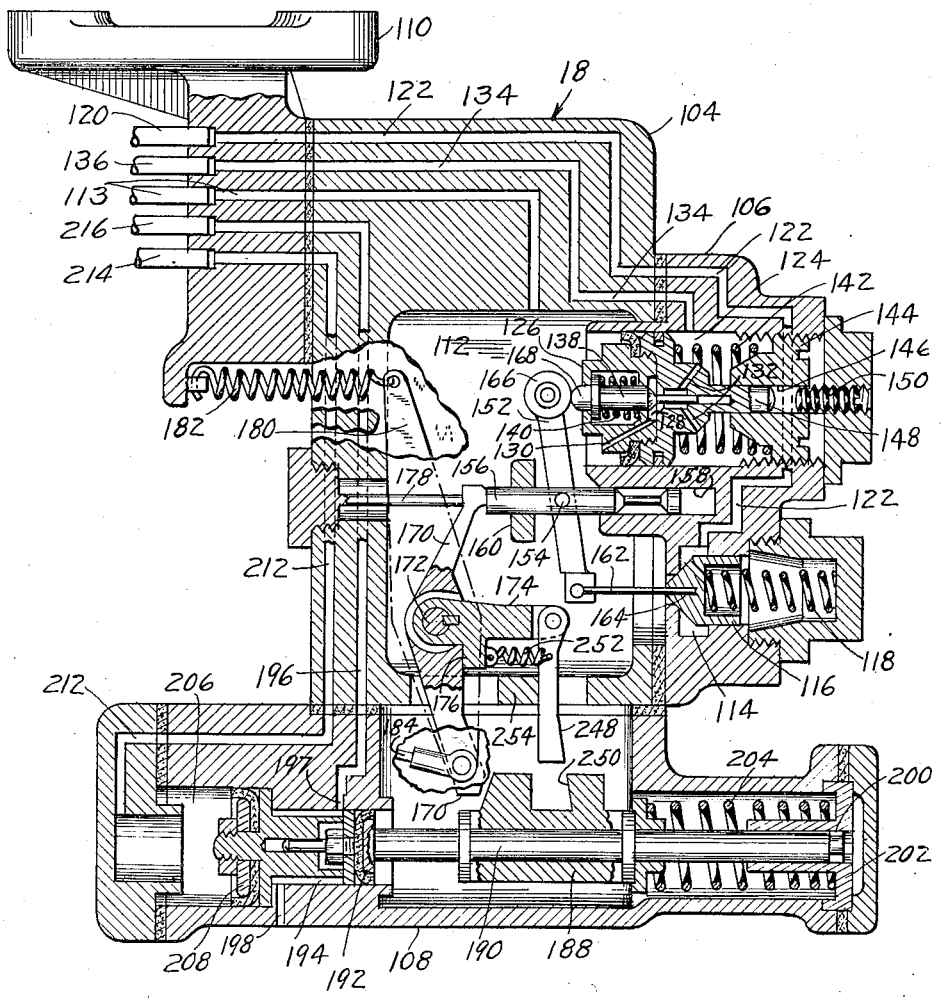
Fig. 5 is a diagrammatic sectional view of the brake valve device shown in Fig. 1.

In the embodiment shown, the magnetic brakes are shown as comprising a plurality of magnetic track shoe devices 10, while the friction brakes may be of any of the usual types operated by brake cylinders 12.

For controlling engagement of the magnetic track shoe devices 10 with the track, I have provided a raising cylinder 14 and a magnet valve device 16 for each magnetic track shoe device.

For controlling the supply of fluid under pressure to the brake cylinders 12, I have provided a brake valve device 18.

For controlling the degree of energization of the magnetic track shoe devices, and the degree of fluid under pressure supplied to the brake cylinders, I have provided a controller device 20, which is shown only diagrammatically and in developed form in Fig. 1, but which may be embodied in the form shown in Fig. 2.

For effecting emergency applications of the brakes other than by operation of the controller device 20, I have provided a foot valve device 22 and a conductor's valve device 24. The foot valve device 22 is intended to provide the usual "deadman" feature in the equipment, while the conductor's valve device 24 is intended to provide means for effecting an emergency application of the brakes at other than the control point in the vehicle or train.

In the embodiment diagrammatically indicated in Fig. 1, I have shown only four magnetic track shoe devices and two brake cylinders, but it will be apparent that any other number of these may be used, according to the braking arrangement desired.

Further, while I have shown an arrangement for adaptation to a single vehicle, it will be quite apparent as the description of the invention proceeds, that the magnetic and friction brakes on any number of units may be controlled in the same manner as described for one unit.

The magnetic track shoe devices 10 may be of any suitable type, and I do not, therefore, wish to be limited in this respect. The track shoe devices are intended to be held in raised position above the track when inoperative, and are intended to be lowered to engagement with the track by the force of gravity when operative to produce a braking effect.

The raising cylinders 14 operate to raise the track shoe devices from the track when inoperative. Each of these raising cylinders comprises a casing defining a piston chamber in which is disposed a piston 26 having a piston rod 28 connecting with and adapted to actuate a bell crank lever 30, which is pivotally mounted at 32 and having one end thereof loosely secured to a track shoe device.

When fluid under pressure is supplied to the raising cylinders, to the right side of each piston 26, the pistons are actuated to move the track shoe devices to their raised or release position. When fluid pressure is released from the raising cylinders, the track shoe devices are lowered by the force of gravity into engagement with the track.

The supply of fluid under pressure to the raising cylinders 14 is controlled by the magnet valve devices 16. Each of these devices comprises a casing provided with a valve chamber 34 in which is disposed a double beat valve 36.

The double beat valve 36 is urged to an upper seated position by a spring 38, to permit fluid under pressure to flow from a reservoir 40, through pipe 42, past the open lower seat of the double beat valve 36, and through passage 44 in the magnet valve device to the connected raising cylinder 14.

The double beat valve 36 is urged toward its lower seat by an electromagnet in the upper portion of the magnet valve device 16, and when in lower seated position the double beat valve releases fluid pressure from the connected raising cylinder 14 to the atmosphere by way of port 46.

Energization of the track shoe devices is controlled through operation of the controller device 20. This device may be provided with a drum 48, which has secured thereto and insulated therefrom contact segments 50, 52, and 54. A plurality of fingers 55 to 65 inclusive are provided for contacting with the segments 50, 52 and 54.

Fingers 55 and 56, together with the segment 50, control energization of the magnet valve devices 16. When the drum 48 is in release position, fingers 55 and 56 are out of engagement with the segment 50, and when the drum is in application position fingers 55 and 56 engage the segment 50 to supply current from a battery 68, or other source of current supply, to the electromagnets in the magnet valve devices.

The fingers 57 to 63, inclusive, are adapted to engage the segment 52 to control the degree of energization of the track shoe devices. Finger 57 is connected to a trolley 70, or other current collecting means, while fingers 58 to 63, inclusive, are connected to sections of a resistance unit 72, and are adapted to be successively engaged by the segment 52 to first connect the resistance unit 72 in series with the track shoe devices and, as the drum 48 is rotated, to sequentially cut the resistance unit out of circuit in sections.

In release position, the fingers 57 to 63 are all out of engagement with the segment 52, but when the drum is moved to application position the fingers 57 and 58 are engaged by the segment 52 at the same time the segment 50 is engaging the fingers 55 and 56, so that the track shoe devices are lowered into engagement with the rails simultaneously with initial energization thereof.

When the finger 63 has finally engaged the segment 52, all of the resistance unit 72 has been cut out of circuit, except a small portion 74 which remains in circuit so long as the track shoe devices are energized. This small portion 74 is provided to secure a rapid rise of current in the windings of the track shoe devices.

When the track shoe devices are deenergized after an application of the magnetic brakes, the collapse of the magnetic field in each shoe may give rise to very high induced voltages in the windings, which may endanger the insulation of the windings. To prevent such induced voltages from rising to dangerous values, fingers 64 and 65 are provided to contact with segment 54 slightly ahead of opening of the circuit to the track shoe devices by disengagement of segment 52 from fingers 57 and 58.

When segment 54 engages fingers 64 and 65, a resistance unit 76 is connected in shunt with the windings of the track shoe devices. This resistance unit provides an energy consuming path for dissipation of the stored magnetic energy in the track shoe devices.

The drum 48 is urged toward release position by action of a spring 78. This spring acts upon a rack 80, which engages a gear 82 secured to a shaft 84 upon which the drum 48 is mounted.

The drum 48 is adapted to be manually actuated to application position by movement of a handle 86. Movement of this handle rotates a gear 88 secured thereto, which gear meshes with and rotates smaller gear 90. The smaller gear 90 is secured to a shaft 92, which has also secured thereto a plate 94 provided with lugs 96. The lugs 96 are adapted to engage coacting lugs 98 on a plate 99 secured to the drum shaft 84.

The lugs 96 and 98 are so arranged that when the handle 86 is moved to application position the lugs 96 and 98 engage to rotate the drum 48 in accordance with movement of the handle 86.

The drum 48 may, however, be rotated other than by movement of the handle 86. One end of the rack 80 is secured to a piston 100, which is operatively mounted in a piston chamber 102 in the lower part of the casing of the controller device 20, and when fluid under pressure is supplied to one side of the piston 100 the rack 80 is moved a sufficient distance to cause the drum 48 to be rotated to its maximum application position. The purpose of providing for this movement of the drum will more fully hereinafter appear.

The brake valve device 18 is preferably of the self-lapping type and comprises a main casing section 104, a valve section 106, an emergency portion 108, and a pipe bracket section 110, which when assembled together define a pressure chamber 112 having constant communication with the brake cylinders by way of pipe and passage 113.

The valve section 106 is provided with a valve chamber 114 in which is disposed a supply valve 116 urged toward seated position by spring 118. The valve 116 controls the supply of fluid under pressure from the main reservoir 40 to the pressure chamber 112, by way of pipes 42 and 120, passage 122, and valve chamber 114.

The valve section 106 is also provided with a piston chamber 124 in which is operatively mounted a movable abutment 126 in the form of a piston. This movable abutment is provided with a valve chamber 128 which is in communication with the pressure chamber 112 by a passage 130.

Disposed in the valve chamber 128 is a release valve 138, which is urged toward unseated position by a spring 140. When release valve 138 is in unseated position the pressure chamber 112 is in communication with the atmosphere, by way of passages 130 and 132, piston chamber 124, passage 134, and pipe 136, and when the release valve 138 is in seated position this communication is cut off.

The movable abutment 126 is subject on one side to the pressure in chamber 112 and on the other side to the pressure of a regulating spring 142. The tension of the spring 142 may be regulated by a regulating member 144. The regulating member 144 is provided with a bore 146 for receiving a plunger portion 148 associated with the movable abutment 126. A regulating screw 150 is adapted to project into the bore 146 for limiting movement of the movable abutment 126 to the right.

For actuating the supply valve 116 to unseated position and the release valve 138 to seated position, there is provided a mechanism including spaced levers 152 secured at 154 to a floating pivot carrier 156, which is slidably interfitted with a bore 158 and partially supported by a guiding lug 160.

Between the lower ends of the spaced levers 152 is loosely held a stem 162 which slidably interfits with a bore 164 in the supply valve 116.

Rotatively held between the upper ends of the spaced levers 152 is a roller 166, which is adapted to engage a rounded end portion 168 of the release valve 138.

It is to be here understood that the supply valve spring 118 is of greater resistance than the release valve spring 140, while the regulating spring 142 is of greater resistance than either of the aforementioned springs. Therefore, when the floating pivot carrier 156 is actuated to the right, the release valve 138 will first be seated, and then the supply valve 116 will be unseated. Regulating spring 142 is of such resistance that movement of the floating pivot carrier has little or no effect thereon.

For actuating the floating pivot carrier 156 to the right, there is provided a lever 170 which is loosely disposed on a shaft 172 supported in the main casing section 104. Secured to the shaft 172 is an intermediate lever 174 provided with a lug 176 which overlies the lever 170, so that when the shaft 172 is rotated in a clockwise direction, the lug 176 engages the lever 170 to cause it to move the floating pivot carrier 156 to the right. A stop 178 limits the backward movement of the lever 170.

For actuating the shaft 172 there is provided an operating lever 180, which is secured to the shaft 172 and urged in a counter-clockwise direction by a spring 182.

For actuating the operating lever 180 in a clockwise direction to cause pressure to be supplied to the pressure chamber 112, and hence to the brake cylinders, there is provided a cable 184 connecting with the lower end of the operating lever 180 and with a cam 186 secured to the shaft which is rotated when the handle 86 of the controller device 20 is moved.

As will be seen from Fig. 1, initial movement of the handle 86 causes a relatively large swing of the operating lever 180 in a clockwise direction, while continuous movement of the lever to application position causes a relatively shorter swing of the operating lever.

When the handle 86 has been moved to application position, and operating lever 180 has been swung a sufficient distance to cause seating of release valve 138 and unseating of supply valve 116, fluid under pressure will flow from the main reservoir 40 to the pressure chamber 112. When the pressure in this chamber has reached a value such that the movable abutment 126 is actuated far enough to the right to permit spring 118 to seat supply valve 116, the supply of fluid under pressure to the pressure chamber will be lapped.

It will, therefore, be obvious that the farther the floating pivot carrier 156 is actuated to the right, the greater will be the pressure required to actuate the movable abutment 126 to the right to cause seating of the supply valve 116. Since movement of the floating pivot carrier 156 is governed by movement of the handle 86 of the controller device, it will be apparent that the pressure at which the valve mechanism laps the supply to the pressure chamber 112 corresponds to the degree of movement of the handle 86.

When the handle 86 has been moved to release position, the floating pivot carrier 156 will be actuated to the left by both springs 118 and 140, so that the supply valve 116 will be seated, and release valve 138 will be unseated, whereupon pressure will be released from pressure chamber 112, and hence the brake cylinders, to the atmosphere.

The emergency portion 108 is provided with a latch block 188 secured to a rod 190. One end of the rod 190 is provided with a piston 192, which is disposed in a chamber 194 and acts to connect a passage 196 with the atmosphere by way of a passage 198, at one time, and with the pressure chamber 112 at another time, the purpose of which will appear presently.

The other end of the rod 190 slidably interfits with a bore 200 in a guiding element 202.

The rod and latch block are urged to the left by a spring 204. As the latch block 188 moves to the left, it engages the lower end of the lever 170 to actuate the floating pivot carrier 156 to the right the same distance as when the handle 86 of the control device is moved to maximum application position.

For actuating the rod 190 and the latch block 188 to the right, there is provided a piston 208 disposed in a chamber 206 and adapted to engage the piston 192 secured to the rod 190. As long as fluid pressure is supplied to the chamber 206 substantially equal to that in the main reservoir 40, the piston 208 will maintain the latch block 188, and rod 190, in the position to the right, as shown in Fig. 5. When fluid pressure is released from the chamber 206, the piston 208 may move to the left, and permit spring 204 to move latch block 188 to the left to engage the lower end of the lever 170.

The chamber 206 is in communication with a chamber 210 in the foot valve device 22, by way of passage 212, pipe 214, for a purpose which will appear presently.

The heretofore mentioned passage 196 leads to the piston chamber 102 in the controller device 20 by way of pipe 216. Therefore, when the rod 190, and piston 192, are positioned to the right, piston chamber 102 is in communication with the atmosphere by way of port 198. When the rod 190 and piston 192 are positioned to the left, the piston chamber 102 has fluid under pressure supplied thereto from the pressure chamber 112, by way of passage 196, through a restriction 197, and pipe 216. The purpose of this will hereinafter more fully appear.

The foot valve device 22 is embodied in a casing provided with the aforementioned chamber 210 and a valve chamber 218. Disposed in the valve chamber 218 is a valve 220, which is urged toward seated position by a spring 222 and to unseated position by action of a foot pedal 224, which when actuated downwardly moves a plunger 226 against a diaphragm 227 to unseat the valve.

When the valve 220 is in unseated position, fluid under pressure flows from the main reservoir 40 through pipe 42, pipe and passage 228, past the unseated valve 220, to chamber 210, and from thence to the piston chamber 206 in the emergency portion 108 by way of pipe 214, and passage 212.

When pressure on the foot pedal 224 is released and the valve 220 is permitted to be seated by its spring 222, diaphragm 227 moves away from seat 230 to permit fluid pressure to be released from chamber 206 to the atmosphere, by way of passage 212, pipe 214, chamber 210, past the open seat 230, and port 232.

The conductor's valve device 24 may also release fluid pressure from the chamber 206, in the same manner as when releasing pressure on the foot pedal 224. This valve device is embodied in a casing provided with a chamber 234, which is connected to the aforementioned pipe 214, leading to the chamber 206, by pipe 236.

Disposed in the chamber 234 is a valve 238, which is urged toward its seat by a spring 240. The valve is adapted to be unseated by movement of a lever 242, which actuates an intermediate lever 244 to unseat the valve. In unseated position the valve permits fluid pressure to be released from the chamber 206 to the atmosphere by way of pipe and passage 246.

The operation of the embodiment shown and described is as follows:

When the vehicle or train is running, the handle 86 of the controller device 20 is maintained in "release" position, which is as shown in Fig. 3, while pressure is maintained on the foot pedal 224 of the foot valve device 22.

Pressure on the foot pedal 224 holds the valve 220 in the foot valve device unseated, so that fluid under pressure is maintained in the chamber 206 of the brake valve device 18. The latch block 188 in the emergency portion 108 of this device is thus maintained in its extreme right hand position.

With the handle 86 in released position, the electromagnets in each of the magnet valve devices 16 are deenergized, so that the double beat valves 36 are maintained in their upper seated position by springs 38. Fluid under pressure is, therefore, supplied from the main reservoir 40 to each raising cylinder 14, thereby holding the track shoe devices 10 in their raised or released position.

When it is desired to effect an application of the brakes, the handle 86 is moved in a counter-clockwise direction to a degree in accordance with the desired degree of braking. Initial movement of the handle 86 rotates cam 186 to swing operating lever 180 of the brake valve device 18 in a clockwise direction, to effect seating of release valve 138 and unseating of supply valve 116.

Fluid under pressure then flows from the main reservoir 40 to the pressure chamber 112 in the brake valve device, from whence it flows to the brake cylinders. The fluid pressure operated brakes are thus first applied.

Upon further movement of the handle 86 the segment 50 of the controller device 20 engages fingers 55 and 56 to energize the electromagnets in the magnet valve devices 16, whereupon each double beat valve 36 is actuated to its lower seated position to release fluid pressure from the raising cylinders 14, and thereby permit the brake shoe devices 10 to be lowered by force of gravity into engagement with the track.

At the same time segment 50 engages fingers 55 and 56, segment 52 engages 57 and 58. Engagement with the finger 57 connects the windings of the track shoe devices to the trolley 70 through the resistance units 72 and 74, a return path to the source of current supply being effected through a return connection, which is diagrammatically indicated at 71. This return connection may be made through the track, a third rail, or any other suitable means.

Shortly after segment 52 engages fingers 57 and 58, segment 54 disengages from fingers 64 and 65, thereby disconnecting the shunting resistance unit 76 from the track shoe devices. Current may then flow from the source of current supply to each track shoe device to cause it to be magnetically attracted to the track. For this position of the handle 86 then, both the fluid pressure operated brakes and the magnetic brakes are effective.

Continued movement of the handle 86 causes successive engagement of the segment 52 with the fingers 59 to 63, inclusive, to cut sections of the resistance unit 72 out of circuit, so as to increase the current supplied to the track shoe devices.

The same movement of the handle 86 also actuates the floating pivot carrier 156 to the right, but at a slower rate than for the initial movement of the handle, as will be obvious from the shape of the cam 186.

For any given position of the handle 86 there is a corresponding position of the floating pivot carrier 156. As before indicated, as soon as the pressure in pressure chamber 112 has reached a value which causes the movable abutment 126 to be actuated to the right to effect seating of supply valve 116, the supply to the pressure chamber will be lapped.

It will thus be seen that both the degree of braking produced by the fluid pressure operated brakes and that produced by the magnetic brakes are controlled in accordance with movement of the handle 86.

When it is desired to effect a release of the brakes, the handle 86 is moved to "release" position. Spring 182 in the brake valve device returns the operating lever 180 to release position, whereupon spring 118 will act to seat supply valve 116, if not already seated, and spring 140 will act to unseat release valve 138, the combined action of these last two springs forcing the floating pivot carrier 156 to the left toward its release position.

Fluid pressure will therefore be released from the pressure chamber 112, and hence from the brake cylinders 12, to the atmosphere.

At the same time, spring 78 returns the drum 48 in the controller device 20, to release position. As the drum rotates toward release position, segment 54 engages fingers 64 and 65 to connect resistance unit 76 in shunt with the windings of the track shoe devices, before the circuit to these windings is broken, so that possible danger to the insulation of the windings due to high inductive voltages is prevented.

When segment 50 disengages from fingers 55 and 56, the electromagnets in the magnet valve devices 16 are deenergized, whereupon the springs 38 actuate the double beat valves 36 to their upper seated position, and fluid under pressure is again supplied to the raising cylinders 14, to raise the track shoe devices to their release, or uppermost position.

The degree of braking, whether for service or emergency application, is controlled by movement of the handle 86. If, however, through accident or design, pressure should be released from the foot pedal 224, the valve 220 would be seated by its spring 222 and the diaphragm 227 would be actuated away from the seat 230.

Seating of valve 220 cuts off the supply of fluid under pressure to pipe 214 (which may be called the safety control pipe) and the chamber 206 in the emergency portion of the brake valve device, while unseating of the diaphragm 227 releases fluid pressure from said pipe and chamber to the atmosphere.

When the pressure in chamber 206 is released to the atmosphere, the spring 204 actuates the latch block 188 to the left to rotate the lever 170 through the same degree of swing as when the handle 86 of the controller device is moved to its extreme clockwise position.

At the same time the latch block 188 moves to the left, the piston 192 secured to the rod 190 disconnects the passage 196 in the brake valve device from communication with the atmosphere, and reconnects the passage with the pressure chamber 112. Fluid under pressure will then flow from the pressure chamber 112 to the piston chamber 102 in the controller device 20.

Fluid pressure in the piston chamber 102 actuates the piston 109 to the left to effect the same degree of rotation of the drum 48 as when the handle 86 is moved to its extreme clockwise position.

It will thus be seen that release of pressure on the foot pedal 224 effects application of both the fluid pressure operated brakes and the magnetic brakes to a maximum degree, which is that corresponding to an emergency application. Operation of the lever 242 of the conductor's valve device 24 will produce the same result.

In order that pressure may be released from the foot pedal 224 when an application of the brakes has been effected by movement of handle 86, there is provided a latch 248, pivotally secured to the intermediate lever 174 in the brake valve device, which is adapted to engage the edges of a recess 250 in the latch lock 188 when the shaft 172 has been rotated. The latch 248 is maintained in position for engagement with the recess 250 by a spring 252, which holds the latch against a rest 254.

It will be obvious that when the shaft 172 has been rotated to effect an application of the brakes, the latch 248 will be lowered into the recess 250, and thereby hold the latch block 188 in release position, so that when pressure is released from the foot pedal 224 the spring 204 will not move the latch block to the left to engage the lower end of the lever 170.

While one embodiment of my invention has been shown and described in detail, it is not my intention to limit the scope of the invention to this embodiment, or otherwise than by the spirit and scope of the appended claims.

Having now described my invention, what I claim as new and desire to secure by Letters Patent, is:

1. In a vehicle brake apparatus, the combination with a brake cylinder and a magnetic track shoe device, of a self-lapping brake valve device for controlling the supply of fluid under pressure to and its release from said brake cylinder, current regulating means for controlling the degree of energization of said track shoe device, manually operated means for controlling operation of said valve device and current regulating means independently but in unison, and means whereby said track shoe device is shunted until said brake valve device has operated to supply fluid under pressure to said brake cylinder when an application of the brakes has been effected.

2. In a vehicle brake apparatus, the combination with a brake cylinder and a magnetic track shoe device, of a self-lapping brake valve device for controlling the supply of fluid under pressure to and its release from said brake cylinder, means for controlling the degree of energization of said track shoe device and providing for shunting of said track shoe device upon deenergization thereof, and manually operated means for controlling operation of said valve device and control means to control the degree of braking produced by fluid supplied to said brake cylinder and current supplied to said track shoe device.

3. In a vehicle brake apparatus, the combination with a magnetic track shoe device, of a controller device having a drum for controlling operation of said track shoe device, a resistance device connected to said drum, means normally urging said drum in a direction to cause deenergization of said track shoe device and to cause said track shoe device to be shunted by said resistance device, and means for operating said drum in an opposite direction to disconnect said shunting resistance device and to effect energization of said track shoe device.

4. In a vehicle brake apparatus, the combination with a magnetic track shoe device, of a controller device for controlling operation of said track shoe device, said controller device having a rotatable drum provided with contacts, certain of said contacts being adapted to effect different degrees of energization of said track shoe device, certain other of said contacts being adapted to shunt a resistance across said track shoe device, means normally urging said drum in a direction to cause deenergization of said track shoe device and to cause said track shoe device to be shunted by said resistance, and manually operating means and fluid pressure operated means for operating said drum in an opposite direction to disconnect said shunting resistance and to effect energization of said track shoe device, said manually operated means and fluid pressure means being adapted to rotate said drum independently of each other.

5. In a vehicle brake apparatus, the combination with a brake cylinder and a magnetic track shoe device, of a self-lapping brake valve device for controlling the supply of fluid under pressure to and its release from said brake cylinder, a circuit for supplying current to energize said track shoe device, a resistance unit in said circuit, a manually operated control element for controlling applications of the brakes according to the degree of movement thereof, means responsive to one movement of said control element toward application position for operating said brake valve device only to produce a chosen brake cylinder pressure, and means responsive to a greater movement of said control element for operating said brake valve device and for connecting said circuit to a source of current supply and cutting out portions of said resistance unit.

6. In a vehicle brake apparatus, the combination with a magnetic track shoe device, of a supply circuit for supplying current to energize said track shoe device, a shunting circuit containing a resistance for shunting said track shoe device, normally closed contacts closing said shunting circuit, means for effecting opening of said normally closed contacts, means for connecting said supply circuit to a source of current supply, and means for preventing opening of said shunting circuit until said supply circuit has been connected to said source.

7. In a vehicle brake apparatus, in combination, a magnetic track shoe device, electroresponsive means for controlling lowering of said track shoe device into engagement with a track rail, a control circuit for controlling operation of said electroresponsive means, a supply circuit for supplying current to said track shoe device, a variable resistor and a fixed resistor in said supply circuit, a shunting circuit containing resistance for shunting said track shoe device, and a controller device having release and application positions, said controller device closing said shunting circuit in release position and operable when moved to application position to close said control and supply circuits before opening said shunting circuit, and operable thereafter to progressively cut said variable resistor out of circuit.

8. In a vehicle brake system, in combination, a brake cylinder, a magnetic track shoe device, a brake valve device operable to effect a supply of fluid under pressure to said brake cylinder, a manually operated controller device operable to effect a supply of current to said track shoe device, fluid pressure means for operating said controller device to application position, and means normally subject to a predetermined fluid pressure and operated upon a decrease in said fluid pressure for operating said brake valve device and for effecting a supply of fluid under pressure to said fluid pressure means to operate said controller device.

9. In a vehicle brake system, in combination, a brake cylinder, a magnetic track shoe device, a brake valve device operable when in application position to effect a supply of fluid under pressure to said brake cylinder, a manually operated controller device operable when in application position to effect a supply of current to said track shoe device, valve means having a piston normally subject on one side to pressure from a chamber and on the other side to pressure from a spring, and means responsive to a reduction of pressure in said chamber for effecting operation of both said brake valve device and said controller device to application position to effect a supply of fluid under pressure to said brake cylinder and a supply of current to said track shoe device to a maximum degree.

10. In a vehicle brake system, in combination, a brake cylinder, a magnetic track shoe device, a brake valve device operable when in application position to effect a supply of fluid under pressure to said brake cylinder, a controller device operable when in application position to effect a supply of current to said track shoe device, manually operated means for operating said brake valve device and controller device to application position, a normally charged pipe, means responsive to a reduction of pressure in said pipe for effecting operation of said brake valve device and said controller device to application position, and means for preventing operation of said last means when said brake valve device and controller device have been operated by said manually operated means.

11. In a vehicle brake apparatus, in combination, a brake cylinder, a magnetic track shoe device, a self-lapping valve device operable to effect a supply of fluid under pressure to said brake cylinder to a degree corresponding to the degree of operation thereof, a manually operated control element having a release position and operable through an application zone for controlling the degree of application of the brakes, means responsive to operation of said control element through a first portion of the application zone for operating said brake valve device to one degree and responsive to movement of said control element through a second portion of the application zone for operating said brake valve device to a different degree, and means responsive only to movement of said control element through the second portion of said application zone for effecting energization of said track shoe device to a degree corresponding to the degree of movement of said control element through said second portion of the application zone.

12. In a vehicle brake system, in combination, fluid pressure brake means, electrical brake means, means for controlling the degree of application of said fluid pressure brake means, means for controlling the degree of application of said electrical brake means, a manually operable control element, means for actuating said two control means independently of each other and according to the degree or extent of movement of said control element, and means whereby the effectiveness of one of said control means is delayed until the other becomes effective.

13. In a vehicle brake system, in combination, fluid pressure brake means, electrical brake means, valve means for controlling the degree of fluid under pressure supplied to said fluid pressure brake means, means for controlling the degree of application of said electrical brake means, a manually operable control element, means for mechanically actuating said two control means independently of each other but simultaneously and to a degree corresponding to the degree of movement of said control element, and means whereby the control means for said electrical brake means is effective later than the control means for said fluid pressure brake means.

14. In a vehicle brake system, in combination, fluid pressure brake means, electrical brake means, a self-lapping brake valve device for controlling the supply of fluid under pressure to operate said fluid pressure brake, current regulating means unaffected by brake cylinder pressure for controlling the supply of current to operate said electrical brake means, and means for preventing said current controlling means supplying current to operate said electrical brake means until said brake valve device has first been operated to a position for supplying fluid under pressure to said fluid pressure brake means to a predetermined degree.

15. In a vehicle brake system comprising a plurality of brake systems, in combination, a plurality of mechanisms for controlling the operation of said brake systems, manually operable means for mechanically actuating said control mechanisms independently of each other but in unison, a safety control pipe normally charged with fluid under pressure, and means operable upon the venting of fluid under pressure from said pipe for automatically effecting operation of said control mechanisms.

16. In a vehicle brake system comprising a plurality of associated brake systems, in combination, a plurality of mechanisms for controlling the operation of said brake systems, a manually operable control element, means responsive to movement of said element for mechanically actuating said control mechanisms simultaneously, means controlled by fluid under pressure for automatically operating said last means, and means under the control of an operator for controlling the operation of said fluid pressure controllable means.

17. In a vehicle brake comprising a plurality of brake systems, in combination, a plurality of mechanisms for controlling the operation of said brake systems, a manually operable control element, means operated in response to movement of said element for mechanically actuating said mechanisms independently of each other but in unison, means for automatically operating said last means, and means controlled by an operator for controlling said automatically operable means.

18. In a vehicle brake system, in combination, fluid pressure brake means, electrical brake means, a brake valve device operable when in application position to effect a supply of fluid under pressure to said fluid pressure brake means, a controller device operable when in application position to effect an application of said electrical brake means, manually operated means for operating said brake valve device and said controller device to application position, a normally charged pipe, means responsive to a reduction of pressure in said pipe for effecting operation of said brake valve device and said controller device to application position, and means for preventing operation of said last means when said brake valve device and controller device have been operated by said manually operated means.

19. In a vehicle brake apparatus, in combination, fluid pressure brake means, electrical brake means, a self-lapping valve device operable to effect a supply of fluid under pressure to said fluid pressure brake means to a degree corresponding to the degree of operation thereof, a manually operated control element having a release position and operable through an application zone for controlling the degree of application of the brakes, means responsive to operation of said control element through a first portion of the application zone for operating said brake valve device to one degree and responsive to movement of said control element through a second portion of the application zone for operating said brake valve device to a different degree, and means responsive only to movement of said control element through the second portion of the application zone for effecting an application of said electrical brake means to a degree corresponding to the degree of movement of said control element through the second portion of the application zone.

20. In a brake equipment for vehicles, in combination, a brake cylinder, an electric braking means, a brake valve device for controlling the supply of fluid under pressure to said brake cylinder, an electric controller for controlling service and emergency applications and release of said electric braking means, a safety control pipe and means responsive to a predetermined reduction in safety control pipe pressure for effecting the supply of fluid under pressure to said brake cylinder, and means responsive to a predetermined reduction in safety control pipe pressure for operating said electric controller to effect an emergency application of the brakes.

21. In a vehicle brake system, in combination, magnetic track brake means, a controller device operable from a release position to an application position to effect a supply of current to said track brake means, a manually operable element, a projection on said controller device and a projection on said manually operable element, said projections co-acting when said manually operable element is moved to operate said controller device to application position, and fluid pressure operated means for actuating said controller device to application position independently of movement of said manually operable element.

JOHN W. LOGAN, Jr.